3,290,283
CARBOXYLIC ACID AMIDE MONO
AZO-DYESTUFFS
Karl Ronco, Muttenz, Switzerland, assignor to Ciba Limited, Basel, Switzerland, a company of Switzerland
No Drawing. Filed Aug. 12, 1963, Ser. No. 301,642
Claims priority, application Switzerland, Aug. 17, 1962, 9,849/62; June 28, 1963, 8,078/63
4 Claims. (Cl. 260—204)

The present invention provides valuable new carboxylic acid amide azo dyestuffs free from groups imparting solubility in water, particularly sulfonic acid and carboxylic acid groups, that correspond to the general formula (1)
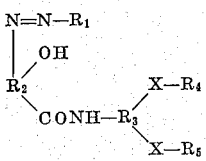

in which $R_1$ and $R_3$ represent benzene radicals, $R_2$ represents a naphthalene radical in which the azo, hydroxyl and carboxylic acid amide group are in 1-, 2- and 3-position respectively, $R_4$ and $R_5$ represent aryl radicals and the symbols X represent carboxylic acid amide radicals. Of special interest are dyestuffs of the formula (2)
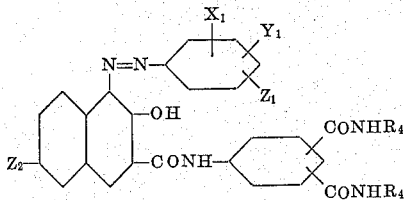

in which $X_1$ represents a halogen atom or a nitro, trifluoromethyl, carbalkoxy or cyano group, $Y_1$ represents a hydrogen or a halogen atom or a trifluoromethyl or alkyl group, $Z_1$ represents a hydrogen or a halogen atom or an alkyl group, $Z_2$ represents a hydrogen or a halogen atom and the symbols $R_4$ represent benzene radicals.

The new dyestuffs are obtained by condensing a monocarboxylic acid halide free from acidic groups imparting solubility in water and corresponding to the formula (3)
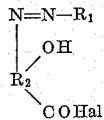

with an amine of the formula (4)
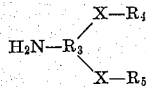

in a molar ratio of 1:1 in which formulae the radicals $R_1$ to $R_5$ and X have the meanings given above.

The azo carboxylic acids corresponding to Formula 3 are obtained by coupling a diazo compound of an aromatic monamine free from acidic groups imparting solubility in water, especially an aminobenzene, with a 2-hydroxy-3-naphthoic acid. As diazo bases the following amines may be mentioned:

4-amino-3-nitrotrifluoromethylbenzene,
5-amino-2-nitrotrifluoromethylbenzene,
3-amino-4-nitrotrifluoromethylbenzene,
4-chloro-2-nitro-1-aminobenzene,
3-aminotrifluoromethylbenzene,
5-chloro-2-aminobenzoic acid methyl ester,
Anthranilic acid methyl ester,
2:4:5-trichloro-1-aminobenzene,
2:5-dichloro-1-aminobenzene,
2:4:6-trichloro-1-aminobenzene,
4-methyl-2-nitro-1-aminobenzene,
2-methyl-5-nitro-1-aminobenzene,
2-nitro-1-aminobenzene,
3-nitro-1-aminobenzene,
2:4-dinitro-1-aminobenzene,
5-methyl-2-methoxy-1-aminobenzene,
2:5-difluoro-1-aminobenzene,
3:5-di-(trifluoromethyl)-1-aminobenzene,
4-chloro-3-amino-trifluoromethylbenzene,
2-methyl-5-chloro-1-aminobezene,
2-methoxy-5-nitro-1-aminobenzene,
2-nitro-4-methoxy-1-aminobenzene,
2-methoxy-5-chloro-1-aminobenzene,
4-nitro-2-cyano-1-aminobenzene, and
2:5-dimethyl-4-chloro-1-aminobenzene.

The azodicarboxylic acids so obtained are treated with agents capable of converting carboxylic acids into their acid halides, for example, their acid chlorides or bromides, particularly phosphorus halides such as phosphorus pentabromide, phosphorus trichloride or phosphorus pentachloride, phosphorus oxy halides and advantageously thionyl chloride.

The treatment with such acid halogenating agents is advantageously carried out in an inert organic solvent, for example, dimethylformamide, chlorobenzenes, for example, mono- or di-chlorobenzene, toluene, xylene or nitrobenzene; the last five solvents may be used together with dimethylformamide if desired.

In the preparation of the carboxylic acid halides it is generally of advantage first to dry the azo compounds which have been prepared in an aqueous medium, or to free them from water by azeotropic distillation in an organic solvent. If desired, this azeotropic drying process can be carried out immediately prior to the treatment with the acid halogenating agents.

The azo dyestuff carboxylic acid halides so obtained are condensed in a molar ratio of 1:1 with an amine of the Formula 4, especially with an aminobenzene dicarboxylic acid dianilide of the formula (5)
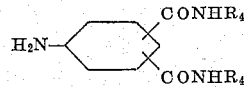

in which the symbols $R_4$ represent benzene radicals. Of special interest are the aminoterephthalic acid dianilides of the formula (6)
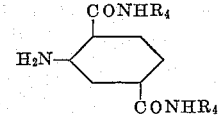

in which the symbols $R_4$ represent benzene radicals.

As examples of aminobenzene dicarboxylic acid diarylides the following may be mentioned:
aminoterephthalic acid dianilide,
aminoterephthalic acid-di-(para-chloranilide),
aminoterephthalic acid-bis-(2':5'-dichloranilide),
aminoterephthalic acid-di-(meta - trifluoromethylanilide),
aminoterephthalic acid-di-(α-naphthylamide),
1-amino-3:5-benzenedicarboxylic acid dianilide,
1 - amino-3:5-benezenedicarboxylic acid-di-(para - chloranilide), and
aminoterephthalic acid-di-(para-methoxyanilide).

Instead of aminobenzene dicarboxylic acid diarylides, diaroyltriaminobenzenes can also be used as amines of Formula 4, especially those of the formula (7)
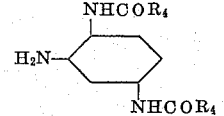

in which the symbols $R_4$ represent benzene radicals, for example 1-amino-2:5-dibenzoylaminobenzene and 1-amino-2:5-di-(para-chlorobenzoylamino)-benzene.

As further monamines there may be mentioned those of the formula (8)

in which $R_4$ and $R_5$ represent benzene radicals.

The condensation of the carboxylic acid halides of the type defined above with the amines is advantageously carried out in an non-aqueous medium. Under these conditions the reaction generally proceeds surprisingly easily at temperatures within the boiling range of the common organic solvents, for example, toluene, monochlorobenzene, dichlorobenzene, trichlorobenzene, nitrobenzene, and the like. In order to accelerate the reaction it is generally of advantage to use an agent capable of binding acid, for example, anhydrous sodium acetate or pyridine. Some of the dyestuffs so obtained are crystalline and others are amorphous. They are generally obtained in a very good yield and in a pure state. It is of advantage first to separate the acid chloride from the carboxylic acid. In some cases, however, the isolation of the acid chloride may be dispensed with without harm, and condensation carried out immediately following the preparation of the carboxylic acid chloride.

The new dyestuffs are valuable pigments and can be used for a wide variety of purposes. For example, they can be used in a finely divided form for the spin-dyeing of rayon and viscose or cellulose ethers and esters or polyamides or polyurethanes, and also for the manufacture of colored lacquers or lakes. They are also suitable for coloring solutions or products of cellulose acetate, nitrocellulose, natural or synthetic resins such as polymerization or condensation resins, for example, aminoplasts, alkyd resins, phenoplasts, polyolefines such as polystyrene, polyvinyl-chloride, polyethylene, polypropylene, and polyacrylonitrile, rubber, casein, silicone and silicone resins. They can also be used in the manufacture of colored pencils, cosmetic preparations or laminated sheet material. The new dyestuffs are distinguished by a very good fastness to light and to migration. Even those dyestuffs of the invention that do not possess a halogen in the arylide radical yield dyeings exhibiting an excellent fastness to light. It may also be mentioned that, by a suitable choice of components, yellow tints can be obtained with the dyestuffs of the invention, which is otherwise not possible with β-hydroxynaphthoic acid arylide azo dyestuffs.

The following examples illustrate the invention. Unless otherwise stated, the parts and percentages are by weight.

Example 1

61 parts of the dyestuff, obtained by diazotising 4-trifluoromethyl-2-nitro-1-aminobenzene in glacial acetic acid or with nitrosyl sulfuric acid and coupling with 2:3-hydroxy-naphthoic acid, were heated for 1 hour at 120° to 125° C., while stirring, with 600 parts of ortho-dichlorobenzen, 2.5 parts of dimethylformamide and 25 parts of thionyl chloride. After cooling the reaction mixture, the precipitated homogeneous crystalline monocarboxylic acid chloride of the dyestuff was isolated by filtration, washed with a small amount of cold ortho-dichlorobenzene and benzene, and dried in vacuo at 50 to 60° C.

8.5 parts of the chloride so obtained were stirred into 500 parts of cold ortho-dichlorobenzene. A warm solution of 7 parts of 2-aminoterephthalic acid diphenylamide in 500 parts of ortho-dichlorobenzene was then added and the mixture stirred for 15 hours at 140 to 145° C. The pigment, which consisted of small, uniformly bent needles, was then filtered off at 100 to 110° C., washed with hot ortho-dichlorobenzene, hot benzene, methanol and water, and then dried in vacuo at 70 to 80° C. The condensation dyestuff of the formula

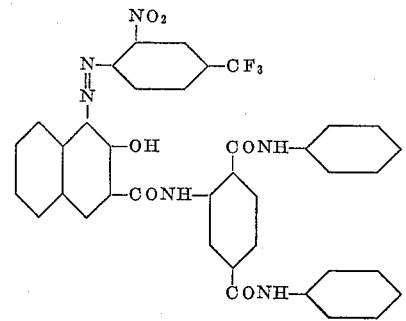

formed a yellow-orange pigment which was sparingly soluble to insoluble in the usual solvents and colored polyvinylchloride foil reddish yellow tints possessing an excellent fastness to light and migration.

| | I | II | III | IV |
|---|---|---|---|---|
| 1 | 4-trifluoromethyl-2-nitro-1-aminobenzene. | 2:3-hydroxynaphthoic acid | 2-aminoterephthalic acid bis-(2':5'-dichlorophenylamide). | Reddish yellow. |
| 2 | do | do | 2-aminoterephthalic acid bis-(4'-chlorophenylamide). | Do. |
| 3 | do | do | 1:4-di-(4'-chlorobenzoylamino)-2-aminobenzene. | Orange. |
| 4 | do | do | 5-amino-isophthalic acid diphenylamide. | Do. |
| 5 | do | do | 5-amino-isophthalic acid bis-(4'-chlorophenylamide). | Do. |
| 6 | do | do | 2-aminoterephthalic acid bis-(3'-trifluoromethylphenylamide). | Yellow-orange. |
| 7 | do | do | 2-aminoterephthalic acid di-α-naphthylamide. | Do. |
| 8 | 5-trifluoromethyl-2-nitro-1-aminobenzene. | do | 2-aminoterephthalic acid diphenylamide. | Orange. |
| 9 | 4-chloro-2-nitro-1-aminobenzene | do | do | Do. |
| 10 | do | do | 5-amino-isophthalic acid bis-(4'-chlorophenylamide). | Red-orange. |
| 11 | 3:5-di(trifluoromethyl)-1-aminobenzene. | do | 1:4-di-(4'-chlorobenzoylamino)-2-aminobenzene. | Orange. |
| 12 | 2:4:5-trichloro-1-aminobenzene | do | 2-aminoterephthalic acid diphenylamide. | Red-orange. |
| 13 | 5-chloro-2-aminobenzoic acid methyl ester. | 2:3-hydroxynaphthoic acid | 5-aminoisophthalic acid diphenylamide. | Orange. |
| 14 | 4-trifluoromethyl-2-nitro-1-aminobenzene. | 6-bromo-2:3-hydroxy-naphthoic acid | 2-aminoterephthalic acid diphenylamide. | Do. |
| 15 | 5-trifluoromethyl-2-chloro-1-aminobenzene. | 2:3-hydroxynaphthoic acid | do | Do. |
| 16 | 2:5-dimethyl-4-chloro-1-aminobenzene | do | 1:4-di-(4'-chlorobenzoylamino)-2-aminobenzene). | Red. |
| 17 | 2:4-dinitro-1-aminobenzene | do | do | Red-orange. |
| 18 | 4-nitro-2-cyano-1-aminobenzene | do | 2-aminoterephthalic acid diphenylamide. | Scarlet. |

The azo dyestuffs monocarboxylic acids obtainable from the diazo components listed in Column I of the above table and the coupling components listed in Column II can be reacted with one mol of the aromatic trinuclear amines listed in Column III via the dyestuff monocarboxylic acid chlorides in a manner analogous to that described in Example 1. Column IV indicates the tints of the polyvinyl-chloride foils prepared with the said pigments.

*Example 2*

65 parts of stabilized polyvinyl-chloride, 35 parts of dioctyl phthalate and 0.2 part of the dyestuff obtained in the manner described in the second paragraph of Example 1 were mixed together, and the mixture worked to and fro for 7 minutes at 140° C. on a two-roll calender. A reddish yellow foil possessing a very good fastness to light and to migration was obtained.

*Example 3*

0.25 part of the dyestuff obtained in the manner described in Example 1, 40 parts of an alkyd-melamine stoving enamel containing 50% of solid substance, and 4.75 parts of titanium dioxide were ground for 24 hours in a rod mill. A thin coating of the enamel so obtained was spread on to aluminum foil and stoved for 1 hour at 120° C.

The reddish yellow enamel coating so obtained exhibited a good fastness to light.

*Example 4*

40 parts of a nitrocellulose lacquer, 2.375 parts of titanium dioxide and 0.125 part of the dyestuff obtained in the manner described in Example 1 were ground for 16 hours in a rod mill. A thin coating of the lacquer so obtained was spread on to aluminum foil. The reddish yellow lacquer coating so obtained possessed very good properties of fastness.

What is claimed is:

1. An azo-dyestuff of the formula

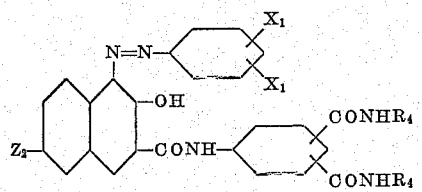

in which $R_4$ represents a benzene radical, $X_1$ is a member selected from the group consisting of chlorine, nitro and trifluoromethyl, $Y_1$ is trifluoromethyl, and $Z_2$ is a member selected from the group consisting of hydrogen and bromine.

2. An azo-dyestuff of the formula

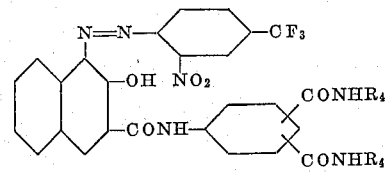

in which $R_4$ represents a benzene radical.

3. The dyestuff of the formula

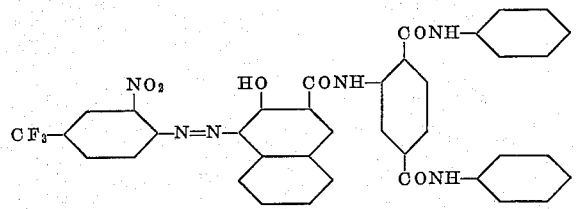

4. The dyestuff of the formula

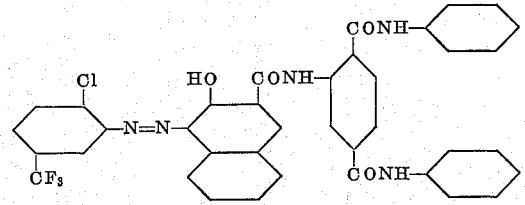

References Cited by the Examiner

UNITED STATES PATENTS

| | | | |
|---|---|---|---|
| 1,947,550 | 2/1934 | Hitch | 260—204 XR |
| 2,210,072 | 8/1940 | Fischer | 260—204 XR |
| 3,086,006 | 4/1963 | Lohe et al. | 260—204 |

CHARLES B. PARKER, *Primary Examiner.*

R. J. FINNEGAN, *Assistant Examiner.*

UNITED STATES PATENT OFFICE
CERTIFICATE OF CORRECTION

Patent No. 3,290,283                        December 6, 1966

Karl Ronco

It is hereby certified that error appears in the above numbered patent requiring correction and that the said Letters Patent should read as corrected below.

Column 5, line 42, the formula should appear as shown below instead of as in the patent:

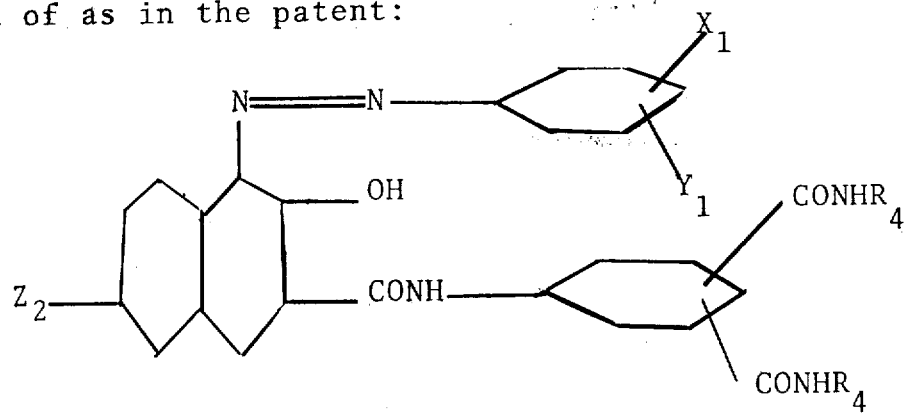

Signed and sealed this 7th day of November 1967.

(SEAL)
Attest:

EDWARD M. FLETCHER, JR.                    EDWARD J. BRENNER
Attesting Officer                              Commissioner of Patents